(12) United States Patent
Samet et al.

(10) Patent No.: US 8,744,770 B2
(45) Date of Patent: Jun. 3, 2014

(54) PATH ORACLES FOR SPATIAL NETWORKS

(75) Inventors: Hanan Samet, College Park, MD (US); Jagan Sankaranarayanan, Santa Clara, CA (US)

(73) Assignee: University of Maryland, College Park, College Park, MD (US)

( * ) Notice: Subject to any disclaimer, the term of this patent is extended or adjusted under 35 U.S.C. 154(b) by 69 days.

(21) Appl. No.: 13/219,163

(22) Filed: Aug. 26, 2011

(65) Prior Publication Data

US 2012/0136575 A1     May 31, 2012

Related U.S. Application Data

(60) Provisional application No. 61/377,795, filed on Aug. 27, 2010.

(51) Int. Cl.
| | |
|---|---|
| *G01C 21/00* | (2006.01) |
| *G01C 21/34* | (2006.01) |
| *G01C 21/26* | (2006.01) |
| *G06F 17/30* | (2006.01) |

(52) U.S. Cl.
CPC ............ *G01C 21/3446* (2013.01); *G01C 21/26* (2013.01); *G06F 17/30241* (2013.01); *G01C 21/00* (2013.01)
USPC ........ 701/540; 701/529; 701/533; 340/995.19

(58) Field of Classification Search
CPC .... G01C 21/3446; G01C 21/26; G01C 21/00; G01C 21/32; G06Q 10/047; G06F 17/30241
USPC .............. 701/529, 533, 537, 540; 340/995.19
See application file for complete search history.

(56) References Cited

U.S. PATENT DOCUMENTS

2011/0208429 A1*   8/2011   Zheng et al. ............... 701/209

OTHER PUBLICATIONS

Hanan Samet, "The Quadtree and Related Hierarchical Data Structures", Computing Surveys, vol. 16, No. 2, Jun. 1984, 74 pages.
Mikkel Thorup et al., "Approximate Distance Oracles", Proceeding STOC '01 Proceedings of the thirty-third annual ACM symposium on Theory of computing, Feb. 9, 2001, 23 pages.
Wolfgang Thomas et al., "STACS 2007", 24th Annual Symposium on Theoretical Aspects of Computer Science Aachen, Germany, Feb. 22-24, 2007, 722 pages.
Jagan Sankaranarayanan, "Scalable Query Proceeding on Spatial Networks", Dissertation 2008, 377 pages.
Hanan Samet et al., "Recent Developments in Linear Quadtree-Based Geographic Information Systems", Aug. 1987, 11 pages.
Mohammad Kolahdouzan et al., "Voronoi-Based K Nearest Neighbor Search for Spatial Network Databases", Proceedings of the 30th VLDB Conference, Toronto, Canada, 2004, 12 pages.
Hanan Samet et al., "Scalable Network Distance Browsing in Spatial Databases", SIGMOD '08 Jun. 9-12, 2008, Vancouver, BC, Canada, 12 pages.

(Continued)

*Primary Examiner* — Gertrude Arthur Jeanglaude
(74) *Attorney, Agent, or Firm* — Squire Sanders (US) LLP (57) ABSTRACT

One embodiment of the invention is directed to a method including constructing a path-distance oracle that provides both an intermediate vertex of a shortest path between two vertices in a spatial network and an approximate distance between the two vertices. The constructing comprises decomposing the spatial network into a set of path-coherent pairs (PCPs) that satisfy at least one predefined property.

24 Claims, 7 Drawing Sheets

(56) References Cited

OTHER PUBLICATIONS

Jagan Sankaranarayanan et al., "Distance Oracles for Spatial Networks", Proceedings of the 25th IEEE International Conference on Data Engineering (ICDE), Shanghai, China, Apr. 2009, 12 pages.

Andrew Goldberg et al., "Computing the Shortest Path: A* Search Meets Graph Theory", Technical Report MSR-TR-2004-24, Mar. 2004, Revised Jul. 2004, 26 pages.

Paul B. Callahan et al., "Faster Algorithms for Some Geometric Graph Problems in Higher Dimensions", Proceeding SODA '93 Proceedings of the fourth annual ACM-SIAM Symposium on Discrete Algorithms, 1993, 10 pages.

Dimitris Papadias et al., "Query Processing in Spatial Network Databases", Proceedings of the 29th VLDB Conference, Berlin, Germany, 2003, 12 pages.

Hans-Peter Kriegel et al., "Hierarchical Graph Embedding for Efficient Query Processing in Very Large Traffic Networks", Proceedings of the 20th Conference on Scientific and Statistical Database Management, Hong Kong, China, 2008, 18 pages.

Zaiben Chen et al., "Monitoring Path Nearest Neighbor in Road Networks", SIGMOD'09, Jun. 29-Jul. 2, 2009, Providence, Rhode Island, USA; 12 pages.

* cited by examiner

PATH ORACLES FOR SPATIAL NETWORKS

CROSS REFERENCE TO RELATED APPLICATIONS

This application claims priority from provisional application Ser. No. 61/377,795 filed on Aug. 27, 2010, the contents of which is hereby incorporated by reference in its entirety.

GOVERNMENT SUPPORT

This invention was made with government support under contract no. CCF0830618 awarded by the NSF. The government has certain rights in the invention.

BACKGROUND

1. Field

Embodiments of the invention relate to systems and methods for finding shortest paths in spatial networks.

2. Description of the Related Art

The trend towards smaller computing platforms and mobile devices, as well as the concomitant increase in their power, has led to an increasing interest in their use to facilitate the mobility of their owners. This has resulted in the development of a new component of the software industry known collectively as location-based services. Such location-based services can be used to continuously monitor ever-changing user positions as well as their destinations, and provide up-to-the-minute (second) information about their environment, as well as paths to their destinations. This is especially useful in an emergency response environment where destinations may change given the continuously changing conditions on the ground. The challenge in providing location information includes the fact that these paths are not simple to compute as it is desirable to take the shortest paths, and the total distance is computed along a network instead of "as the crow flies."

In fact, changes may occur so quickly that there may not be enough time to compute exact answers and, therefore, many solutions resort to estimates (i.e., approximate answers) with some guarantee of optimality (i.e., within some tolerance e). Moreover, in these situations, there is a need to interact with a multitude of information sources such as road networks, building diagrams, service areas, etc. Increasingly, these information sources are stored in databases that must be accessible using a common interface (i.e., language), most often some variant of SQL.

SUMMARY

One embodiment of the invention is directed to a method including constructing a path-distance oracle that provides both an intermediate vertex of a shortest path between two vertices in a spatial network and an approximate distance between the two vertices. The constructing comprises decomposing the spatial network into a set of path-coherent pairs (PCPs) that satisfy at least one predefined property.

Another embodiment is directed to an apparatus including a processor, and memory including computer program code. The processor and memory are configured to control the apparatus to construct a path-distance oracle that provides both an intermediate vertex of a shortest path between two vertices in a spatial network and an approximate distance between the two vertices. The processor and memory are further configured to control the apparatus to construct the path-distance oracle by controlling the apparatus to decompose the spatial network into a set of path-coherent pairs (PCPs) that satisfy at least one predefined property.

Another embodiment includes a computer program, embodied on a non-transitory computer readable medium. The computer program configured to control a processor to perform a process including constructing a path-distance oracle that provides both an intermediate vertex of a shortest path between two vertices in a spatial network and an approximate distance between the two vertices. The constructing comprises decomposing the spatial network into a set of path-coherent pairs (PCPs) that satisfy at least one predefined property.

BRIEF DESCRIPTION OF THE DRAWINGS

For proper understanding of the invention, reference should be made to the accompanying drawings, wherein.

DETAILED DESCRIPTION

Spatial networks may refer to general graphs whose vertices and edges are augmented with spatial information. S denotes a d-dimensional embedding space (i.e., a reference coordinate system), which is two-dimensional for road networks. A spatial network can be abstracted to form an equivalent graph representation G=(V,E), where V is the set of vertices, E is the set of edges, n=|V|, and m=|E|. Given edge e∈E, w(e)≥0 denotes the distance along e. In addition, for every v∈V, p(v) denotes the spatial position of v with respect to S.

A path $\pi$ of length k is a sequence of vertices $(\pi_1, \ldots, \pi_{k+1})$ such that $(\pi_i, \pi_{i+1}) \in E$ for $1 \leq i \leq k$, where $\pi_1$ is referred to as the source vertex of $\pi$ and $\pi_{k+1}$ is referred to as the destination vertex of $\pi$. $\pi(u, v)$ denotes a path (not necessarily the shortest path) with u as its source vertex and v as its destination vertex. The sequence of edges that make up the path $\pi$ is denoted by the sequence $\phi(\pi)$, where $\phi_i(\pi)=(\pi_i, \pi_{i+1})$. Furthermore, the weight $w(\pi)$ of a path $\pi$ of length k is $w(\pi)=\Sigma^k_{i=1} w(\phi_i(\pi))$. Two paths $\pi_1(v, t)$ and $\pi_2(t, u)$ can be composed to form another path $\pi$ denoted by $\pi_1 \to \pi_2$. A subpath of a path $\pi$ is a subsequence of $\pi$. The set of vertices that make up the shortest path between a pair of vertices u, v Î V is denoted by $\pi_G(u, v)$. Also, any subpath $\pi(r, t)$ of $\pi_G(u, v)$ is also the shortest path between r and t. If there are multiple shortest paths of the same length between vertex pairs, extra care must be taken to ensure that the above property holds. In such cases, the first path in the lexicographic ordering on the set of possible shortest paths is chosen, such that the ordering is defined on triples $(w(\pi), k, \text{reverse}(\pi))$, where the reverse operator takes an ordered set as input and reverses its ordering. Furthermore, two sequences $\pi_1$ and $\pi_2$ are disjoint, if and only if $\pi_1 \cap \pi_2 = \emptyset$. Notice that if two paths $\pi_1(v, t)$ and $\pi_2(t, u)$ are disjoint from a path π* then the path $\pi_1 \to \pi_2$ is also disjoint from π*. Moreover, if $\pi_1$ is disjoint from $\pi_2$ then any subpath of $\pi_1$ is also disjoint from $\pi_2$.

For vertices u, v Ï V, $d_G(u, v) = w(\pi_G(u, v))$ is defined to be the shortest network distance from u to v with respect to G(V, E). The spatial distance $d_S(u, v)$ (i.e., "as the crow flies.") between vertices u, v∈V in a spatial network is defined as a function on p(u) and p(v). Also, $l_u(v)$ is defined to be the next vertex visited (after u) on the shortest path from u to v. Note that the first edge on the shortest path from u to v is $(u, l_u(v))$.

T is the root block of a PR-quadtree H on the spatial positions of the vertices V. A PR-quadtree is a hierarchical decomposition of the embedding space S such that every block is decomposed into $2^d$ children blocks until a leaf block is obtained, which corresponds to a region in space containing a single vertex in V. A non-leaf block in H, on the other hand, represents a region in the embedding space containing a subset of vertices (more than one) in V. An addressing scheme for a block b can be devised by a bit-encoding obtained by concatenating the bits corresponding to the path taken to reach b from the root block T. Embodiments of the invention may use this representation, also known as the Morton Blocks, in order to uniquely identify blocks in a PR-quadtree.

Embodiments of the invention address how to find shortest paths in a dynamically changing environment which is only the first step in being able to perform a wide variety of operations on spatial networks such as region searches, nearest neighbor finding and distance joins. One challenge is that finding shortest paths and distances invariably involves a search process (e.g., via use of a shortest path algorithm), which takes quite a bit of time, and is not a satisfactory solution in terms of data that is organized using a relational database and is accessed via SQL SELECT operations, for example. Embodiments of the invention are based on pre-computing the shortest paths between all possible sources and destinations, and encoding them in a compact form which lends itself to being stored and retrieved in/from a conventional relational database.

Figure 1:
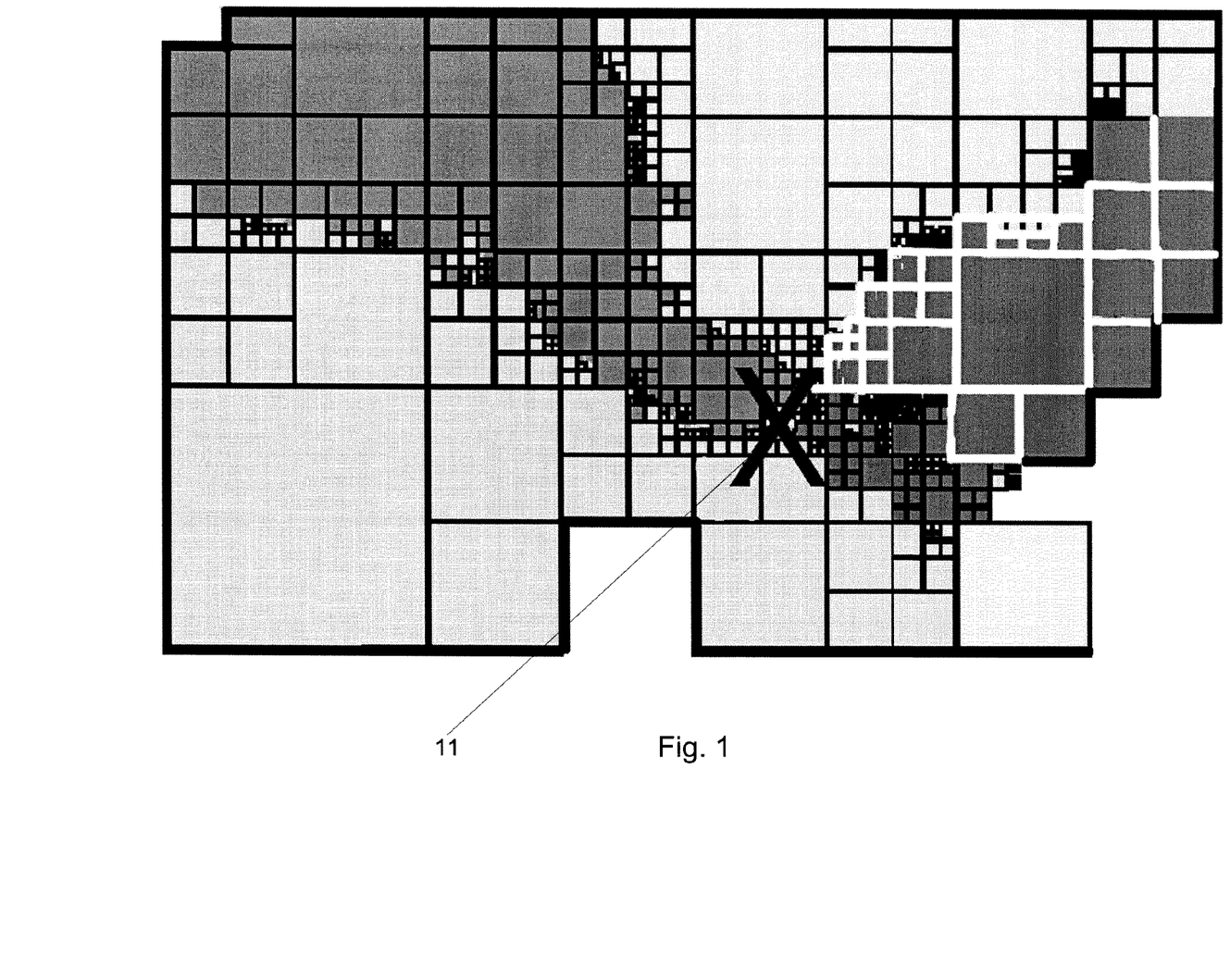
FIG. 1 illustrates a space partition according to one embodiment.

Certain embodiments extend the concept of the shortest-path map, whose representation by the shortest-path quadtree, enabled a reduction in the necessary storage for the set of all of the shortest paths from $O(n^3)$ to $O(n^{1.5})$. This was achieved by taking advantage of the fact that the shortest paths from a particular vertex v to all of the remaining vertices can be partitioned into i subsets depending on the identity of the first edge (there are i such edges) on the shortest paths to them from v. For example, FIG. 1 illustrates a space partition induced by aggregating vertices sharing the same first link 11 in the shortest path from a given source vertex in a road network. This is characterized as taking advantage of the path coherence of the destination vertices. In one embodiment, the shortest paths are derived by an iterative process that repeatedly finds the next vertex or edge to the destination and thus lends itself to a database solution (i.e., the repeated retrieval of information) rather than a graph search. In particular, the process is several times faster than conventional graph-based solutions, and also casts a nice balance between offline and online computation of the shortest paths.

Embodiments of the invention are able to reduce the space requirements from $O(n^{1.5})$ to $O(n)$ by also capturing the path coherence of the source vertices, instead of just the path coherence of the destination vertices. As an example of the advantage of capturing the path coherence of source vertices, someone who is driving along the shortest route from the Northeast of the US to the Northwest Coast of the US will invariably end up using Highway I-80 West. This path coherence is most evident when the sources and destinations are sufficiently far apart in the road network. For instance, of the amount of space that can be potentially saved, suppose that there are one million source vertices and one million destination vertices. If for each such pair of vertices, a vertex on I-80West is stored, this would incur a storage cost of $10^{12}$ pieces of information; while when using the path coherence techniques, storage can be achieved in O(1) space by virtue of storing just one item of information for the set of vertices in the Northeast Coast, one intermediate vertex, and one item of information for the set of vertices on the Northwest Coast.

Figure 2:
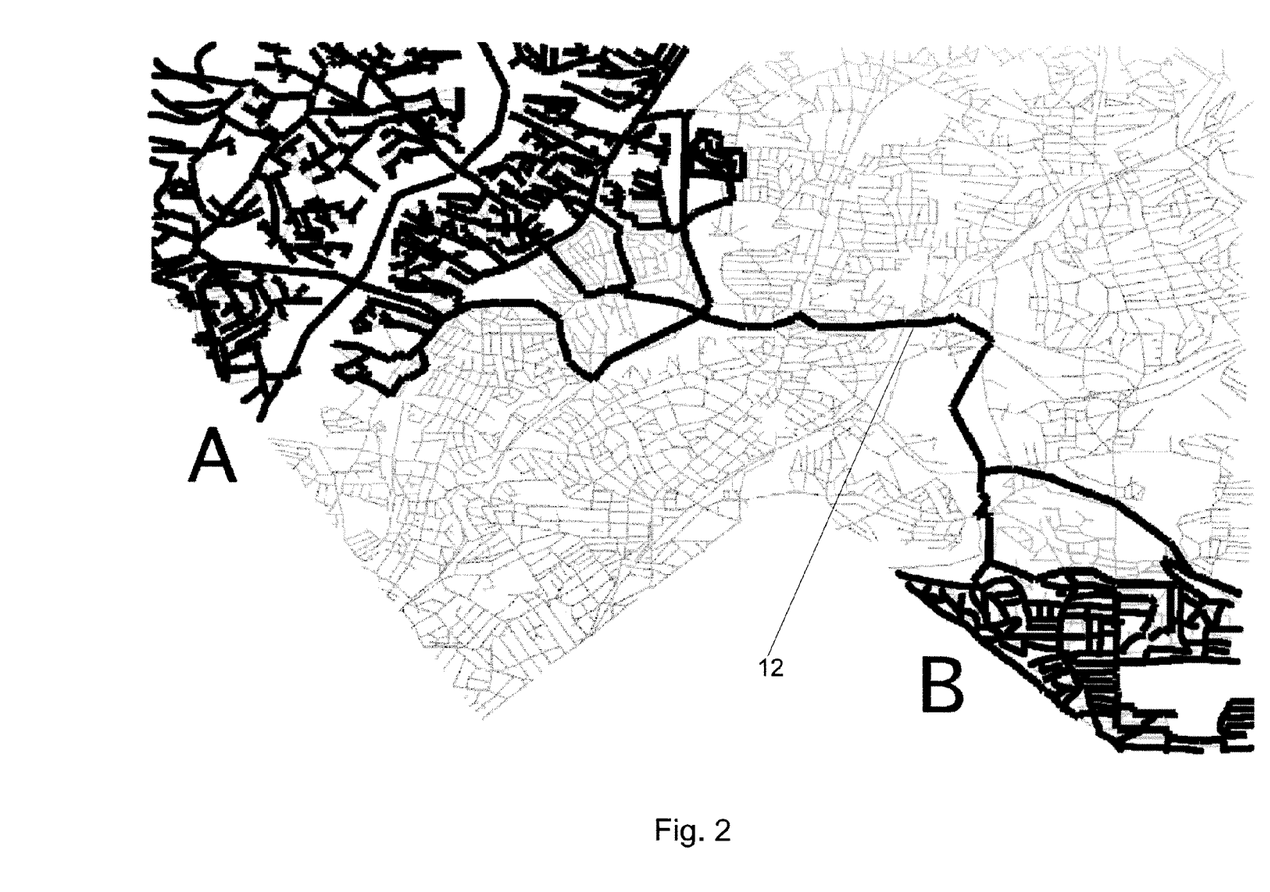
FIG. 2 illustrates an example of a set of sources and destinations that share vertices in the shortest paths, according to an embodiment.

FIG. 2 illustrates an example of such a configuration of a set of sources and destinations that share vertices in the shortest paths resulting in storing partial path information of 30,000 shortest paths using O(1) storage. In particular, FIG. 2 depicts the 30,000 shortest paths between two subsets A, B of vertices in a road network passing through a single common vertex 12. As will be discussed below, for a spatial network of size n, there are O(n) such groups of O(1) size that capture all of the $O(n^2)$ shortest paths of the network. This partitioning of the vertices into appropriate subsets of source and destination vertices may be achieved by appealing to the Well-Separated Pair (WSP) decomposition.

Embodiments of the invention use the term oracle to describe a data structure, or representation, or a relation in a database that captures all the shortest paths. Three such oracles are described in this disclosure.

First, given a source and a destination vertex in a spatial network G, and letting s be a factor depending on G, embodiments of the invention provide a path oracle of size $O(s^2n)$ that enables the retrieval of an intermediate vertex on the shortest path between them in $O(\log n)$ time. This may be done via use of a B-tree.

Next, for a source and a destination vertex in a spatial network G, an ε-approximate distance oracle that requires $O(n/\epsilon^2)$ space can be constructed that enables the retrieval of a network distance between the two vertices that lies within ε of the true network distance between them in $O(\log n)$ time.

Finally, embodiments of the invention provide a combination of the path oracle and distance oracle to define a path-distance oracle that can provide both an intermediate vertex, as well as an ε-approximate distance in $O(\log n)$ time using $O(n \cdot \max(s^2, 1/\epsilon^2))$ space via the use of a B-tree.

Experimental results show that for road networks of different sizes n (for which s turned out to lie in the range 8.15), the size of the path-distance oracle is about 122n and provides answers in 10-35 μseconds for ε=20%. When ε was allowed to vary between 1 and 50%, and n was kept constant at 91,113, the size of the path-distance oracle was $O(n \cdot \max(12^2, 2.5^2/\epsilon))$ and provided answers in 30-35 μseconds. According to certain embodiments, access times can be further improved to O(1) by making using of a hash table that takes $O(s^d n \log n)$ for path oracles and $O(n \log n \cdot \max(s^d, 1^d/\epsilon))$ for path-distance oracles.

Embodiments of the invention demonstrate that shortest paths can be computed by the repeated application of a SQL SELECT statement, or some other equivalent database operator. Moreover, by having the ability to refine the paths, the network distance value can also be refined, which is an improvement on previous solutions that only provided one predicted approximate distance value. This ability to refine the distance enables embodiments of the invention to obtain exact values and thereby enables obtaining exact, rather than approximate, responses to a number of spatial queries via SQL relational operators, for example. The path-distance oracle on a spatial network may be related to oracles on other kinds of graphs (e.g., general graphs) as well as to those that view spatial networks as a general metric space and apply an embedding method.

According to embodiments of the invention, pre-computation of the shortest-paths obviates the need to search, and instead replaces it with a retrieval process which is much faster. Additionally, query processing using the oracles according to embodiments of the invention and the shortest-path quadtree perform operations that are spatial in nature and hence, more suitable for incorporation into a database. Finally, once the representation is computed for a spatial network it can be used in conjunction with any dataset of entities (e.g., restaurants, coffee shops) that lie on the spatial network as long as the network itself remains unchanged.

Vertices in a spatial network that are spatially close to one another share a number of common properties. For example, often two vertices u, v that are spatially close to each other share large common segments of their shortest paths to two other vertices t, w that are also spatially close to each other, but far from u, v. The term path coherence describes this coherence between the shortest paths from nearby sources to nearby destinations. FIG. 2 illustrates a configuration of source A and destination B vertices such that every shortest path from a vertex u∈A to a vertex t∈B passes through a particular set of vertices. Two sets of vertices A, B are said to form a Path-Coherent Pair (PCP) if all the shortest paths from source vertices in A to destination vertices in B have at least one vertex or one edge 12 in common, as shown in FIG. 2. According to embodiments of the invention, a path oracle relies on decomposing a given spatial network G into path-coherent pairs such that they capture all the $n^2$ shortest paths in G.

The arrangement of vertices and shortest paths in FIG. 2 describes a dumbbell-like structure. A PCP (A, B, Ψ, λ) in a spatial network G(V, E) includes a set of source vertices A⊂V, a set of destination vertices B⊂V, a set Ψ which is a vertex or an edge such that all the shortest paths from source vertices in A to destination vertices in B contain Ψ, λ∈R⁺ approximates the network distances of all the shortest paths from A to B. A and B are referred to as the heads of the PCP. A PCP (A, B, Ψ, λ) belongs to one of the two possible configurations given below:
(A, B, Ψ={u}, λ), where A∩B=∅, u∈V, u∉A and u∉B
(A, B, Ψ={<u, v>}, λ), where A∩B=∅, <u, v>∈E and u∉B and v∉A
Note that any edge <u, v>∈E in G is a PCP of the form (u, v, <u, v>, λ).

Given a spatial network G, embodiments of the invention perform a decomposition G⊗G of G, into a set of PCPs, such that the resulting decomposition has the following properties:
1. $G \otimes G = U^l_{i=1}(A_i, B_i, \Psi_i, \lambda_i)$, where $(A_i, B_i, \Psi_i, \lambda_i)$ is a PCP∀i=1, . . . , l, such that $A = U^l_{i=1} A_i$ and $B = U^l_{i=1} B_i$.
2. $(A_i \cap B_i) = \emptyset$, ∀i=1, . . . , l.
3. For any two PCPs $(A_i, B_i, \Psi_i, \lambda_i), (A_j, B_j, \Psi_j, \lambda_j)$, 1≤i<j≤l in G⊗G, the resulting decomposition has the property that $(A_i \cap A_j) \_ (B_i \cap B_j) = \emptyset$. In other words, for any pair of vertices (u, v), there exists a unique PCP $(A_i, B_i, \Psi_i, \lambda_i)$ in G⊗G, such that u∈$A_i$, v∈$B_i$.

The first property ensures that the decomposition of G results in a set containing l PCPs, where the $i^{th}$ PCP in the decomposition is denoted by $(A_i, B_i, \Psi_i, \lambda_i)$. The second property ensures that the heads $A_i$ and $B_i$ of a PCP are disjoint. The third property ensures that any pair of vertices (u, v) in G is contained in exactly one of the PCPs in the decomposition. This also means that the PCP decomposition contains all the $n^2$ shortest paths in G. Below are the definitions of path, distance and path-distance oracles according to an embodiment:

1. Path Oracle: A path oracle of a spatial network G is a PCP decomposition of G.
2. Path-Distance Oracle: A path-distance oracle of a spatial network G is a PCP decomposition of G of the form $(A_i, B_i, \Psi_i, \lambda_i)$ with the additional property that $(1-\epsilon) \cdot \lambda_i \leq d_G(u,v) \leq (1+\delta) \cdot \lambda_i$, where u∈$A_i$, v∈$B_i$. In other words, a path-distance oracle stores a common intermediate vertex or edge $\Psi_i$ in the shortest paths from $A_i$ to $B_i$ as well as an ϵ-approximation $\lambda_i$ of the network distances from $A_i$ to $B_i$.
3. Distance Oracle: A distance oracle is a decomposition of a spatial network G into triples of the form $(A_i, B_i, \lambda_i)$ such that $A_i \subset V$, $B_i \subset V$, $A_i \cap B_i = \emptyset$, $\lambda_i$ is an ϵ-approximation of the network distances from $A_i$ to $B_i$ and given any pair of source and destination vertices, it is contained exactly in one of the triples in the decomposition. In other words, the above decomposition is similar to the path-distance oracles with the difference that, now, all the shortest paths from $A_i$ to $B_i$ no longer have to pass through a single common vertex or edge.

Embodiments of the invention include a method that constructs path, distance, and path-distance oracles. Table 1 shown below lists an example of a PCP decomposition method in pseudo-code format that decomposes a spatial network G(V,E) into a set of PCPs thereby constructing a path, distance, and/or path-distance oracle, according to one embodiment. The method takes G, the root block T of a PR-quadtree H on the spatial positions of V, the type of oracle ORACLETYPE, and the quality of approximations as inputs. The possible values for ORACLETYPE are PATH, DISTANCE, or PATH-DISTANCE. The value of ϵ should be specified for distance and path-distance oracles, but is assumed to be ∞ for path oracles.

Q refers to a list of block-pairs, which is initialized with the pair (T,T) in line 1 of Table 1. At each stage of the method, a block-pair (A,B) is retrieved from Q and examined in line 3. Note that A and B correspond to blocks in the PR-quadtree on V. If A and B refer to the same block (line 4) and A (and B) is a non-leaf block, then DECOMPOSEANDINSERT operator is invoked with Q, A, and B. The DECOMPOSEANDINSERT operator takes two blocks A and B and a list Q as inputs. It first breaks up A and B into their $2^d$ children blocks, forms all possible pairs obtained by taking non-empty children blocks of A and B which are then inserted into Q. Note that if the DECOMPOSEANDINSERT operator is invoked on A and B such that one of them is a Leaf block, it can be still broken up into $2^d$ children blocks, but all but one of the children blocks will be empty.

If A and B do not refer to the same block in the PR-quadtree, the PCP decomposition method invokes the FIND-PATHCOHERENTPAIRS operator on A and B in line 9 that returns, if it exists, a vertex or an edge Ψ that is common to the shortest paths from source vertices in A to destination vertices in B, as well as an approximate network distance λ, and the maximum error $\epsilon_H$ in approximating the network distances by λ. Optionally, we can also obtain the minimum error in approximating the network distances between vertices in A and B by λ. Both the values of $\epsilon_L$ and $\epsilon_L$ can also be stored along with the PCPs in the output. Given (A, B), efficient methods for computing λ and $\epsilon_H$ are known. One possible way of finding whether a common vertex or edge Ψ exists is to compute the shortest path from every pair of source vertices in A to destination vertices in B using Dijkstra's algorithm and determine if there is a vertex or edge in common between all the shortest paths. If there is more than one vertex in common to all the shortest paths then one of the vertices is chosen at random; preferably one not belonging to either A or B. The case that an edge is common to all the shortest paths occurs only if all the shortest paths pass through an edge <u, v>, such that u∈A or {u}=A, and v∈B or {v}=B. An example of such a configuration arises if a bridge or a tunnel represented by an edge connects vertices belonging to two cities denoted by A and B.

If ORACLETYPE is DISTANCE (line 10), it is examined whether the quality of the approximation $\epsilon_H$ is less than or equal to the desired approximation $\epsilon$. If so, the pair (A, B, _, $\lambda$) is added to the result set using the REPORTPCP procedure. If not, A and B is split into block-pairs formed by children blocks of A and B, which are then inserted into Q.

If ORACLETYPE is PATH, it is checked whether Ψ is empty in which case (A, B) is not a valid PCP and the block-pair (A, B) has to be further decomposed. If Ψ is a vertex that does not belong to either A or B, it is reported as a PCP, otherwise it is further decomposed. If Ψ=(u, v) is an edge, it is ensured that u∉B and v∉A, in which case it is reported as a PCP. It is noted that all other possible cases, i.e., when u∈B, and/or v∈A are all undesirable.

Finally, if ORACLETYPE is PATH-DISTANCE and (A, B, Ψ, $\lambda$) satisfies both the path and distance constraints, it is added to the result set.

The PCP decomposition method terminates when Q is empty at which point the decomposition of G into PCPs is complete. Note that, according to an embodiment, the method breaks up both A and B in a symmetric fashion which means that the heads of the PCP in the output are at the same level in H, and, consequently, of the same size. Further, it should be noted that the output of the PCP decomposition method, according to one embodiment, is an oracle of order n.

TABLE 1

Procedure PCPDECOMPOSE[G, T, ORACLETYPE, $\epsilon = \infty$]
Input: G(V, E) ← Input spatial network
Input: T ← Root node of a PR-quadtree H on V
Input: ORACLETYPE ← PATH, DISTANCE, or PATH-DISTANCE
Input: $\epsilon$ ← Required approximation; $\infty$ if not specified
Output: Set of PCPs (A, B, Ψ, $\lambda$, [$\epsilon_L$, $\epsilon_H$]); [$\epsilon_L$, $\epsilon_H$] is optional
(* Q ← list of block-pairs *)
1. INSERT(Q, (T,T))
2. while (ISNOTEMPTY(Q)) do
3.    (A;B) ←POP(Q) (* Remove head element *)
4.    if A = B then
5.       if ISNONLEAF(A) then
6.          DECOMPOSEANDINSERT(Q, A, B)
7.       end-if
8.    else
9.       (Ψ, $\lambda$, $\epsilon_H$, [$\epsilon_L$]) ←FINDPATHCOHERENTPAIRS(A,B)
10.      if ORACLETYPE = DISTANCE or PATHDISTANCE then
11.         if $\epsilon_H$ > $\epsilon$ then
12.            DECOMPOSEANDINSERT(Q, A, B)
13.         else if ORACLETYPE = DISTANCE then
14.            REPORTPCP(A, B, Ψ, $\lambda$, [$\epsilon_L$, $\epsilon_H$])
15.         end-if
16.      end-if
17.      if ORACLETYPE = PATH or PATH-DISTANCE then
18.         if Ψ = ∅ then
19.            DECOMPOSEANDINSERT(Q, A, B)
20.         else if TYPE(Ψ) = VERTEX then
21.            if Ψ∈A or {Ψ} = A or Ψ∈B or {Ψ} = B then
22.               DECOMPOSEANDINSERT(Q, A, B)
23.            else
24.               REPORTPCP(A, B, Ψ, $\lambda$, [$\epsilon_L$, $\epsilon_H$])
25.            end-if
26.         else if TYPE(Ψ =< u, v >) = EDGE then
27.            if u∉B and v∉A then
28.               REPORTPCP(A;B;Y=< u;v >;l; [eL;eH])

TABLE 1-continued

29.            else
30.               DECOMPOSEANDINSERT(Q, A, B)
31.            end-if
32.         end-if
33.      end-if
34.    end-if
35. end-while As can be seen, the PCP decomposition method shown in Table 1 decomposes G into a set of PCPs that satisfies properties 1-3 discussed above. Thus, given a vertex pair a, b, it is guaranteed that there exists exactly one PCP (A, B, Ψ, $\lambda$) in the output of the method such that A contains a, B contains b, Ψ is an intermediate vertex or edge in the shortest path from a to b, and $\lambda$ approximates the network distance between a and b.

The REPORTPCP routine shown above in Table 1 stores the PCP decomposition as a relation O in a database system with the following schema: O(AB, IE, VI, Es, EE, $\lambda$), where AB are the heads of the PCP represented as a single four-dimensional Morton block, IE is a Boolean flag that indicates if the tuple representing a PCP stores an intermediate vertex or edge. If IE is set to false, then VI stores an intermediate vertex, otherwise <ES, EE> represents an intermediate edge. Finally, the value of $\lambda$ represents the approximate network distance between the heads of the PCP. Both the heads of the PCP, A and B, correspond to nodes of a PR-quadtree on V. Hence, (A, B) can be compactly represented as a single four dimensional Morton block. A four-dimensional Morton block AB of (A, B) is obtained by first constructing the Morton blocks corresponding to A and B, and then bit-interleaving them to obtain AB. Now, the attribute AB in the relation O is indexed using a B-tree or B+-tree, and the resulting representation is known as a linear quadtree, which is a disk-efficient access structure.

Given a source u and destination v, we can obtain an intermediate vertex or edge in the shortest path between u and v as well as an approximate network distance $\lambda$ using the relation O by first constructing the four-dimensional Morton block $Z_4$(u, v) of (u, v), and using it to search the B-tree or B+-tree on AB for the longest prefix match to $Z_4$(u, v), where Z4(•,•) is a function that takes a pair of two dimensional points and converts them into a single four dimensional Morton block representation. Note that Z4(•,•) can be computed in O(1) time using bit-operations. Searching the index on AB takes logarithmic time in the number of tuples in O. According to embodiments of the invention, this can be achieved in O(log n) time as the size of the oracle is linear in n. The above operation corresponds to a "SELECT" operator on O. The shortest path between u and v can be retrieved by the repeated application of the SELECT operation on O.

Another embodiment includes a shortest path method that provides a shortest path between two vertices. Table 2 below illustrates an example of the shortest path method in pseudo-code format that takes a source vertex u and a destination vertex v as inputs, and then retrieves the shortest path $\pi_G$(u, v) between u and v in G. In lines 1-3 of Table 2, it is checked if u and v are the same, in which case, the shortest path method returns {u}. This is the base case of the method. In line 4 of Table 2, using the Morton block $Z_4$(u, v) of u, v as the search key on the B-tree on AB, tuple in O(AB, IE, VI, Es, EE, $\lambda$) can be obtained, such that AB contains $Z_4$(u, v). Note that the nature of the PCP decomposition guarantees that there will be exactly one matching tuple in O for any search key $Z_4$(u, v). If A and B share an edge (in which case IE is set to true as shown in lines 5-6), $\lambda_G$(u, v) is represented as a composition of SPATH(u, ES)→<ES, EE>→SPATH(EE, v), resulting in subsequent recursive calls to the shortest path method. If A and B share an intermediate vertex VI (in which case IE is set to false), two instances of the shortest path method are recursively invoked with inputs (u, VI) and (VI, v) as shown in line 8.

TABLE 2

Procedure SPATH[u, v]
Input: u, v ← Source and Destination vertices
Output: Shortest path $\pi_G$(u, v) between u and v
(* O(AB, IE, VI, Es, EE, λ) Oracle relation *)
1. if u = v then (* Base case of the recursion *)
2.     return {u}
3. end-if
4. SELECT IE, VI, ES, EE FROM O WHERE AB = $Z_4$(u, v)
5. if (IE = true) then
6.     return SPATH(u, ES)→<ES, EE>→SPATH(EE, v)
7. else (* IE = false *)
8.     return SPATH(u, VI)→SPATH(VI, v)
9. end-if Embodiments of the invention are capable of storing the oracle(s) as a relation in a database system. The oracle is seamlessly integrated into the relational database system, indexed using a traditional indexing scheme (e.g., B-tree), and used in complicated query processing scenarios without the need to make any significant changes to existing database systems. For example, one embodiment incorporates a path-distance oracle in a SQL-based system that can perform complex queries on a spatial network using a relational database system. In one example, O is the path-distance oracle with the schema: O(AB, IE, VI, ES, EE, λ, $\epsilon_L$, $\epsilon_H$). It is noted that the schema has been expanded by augmenting two additional attributes $\epsilon_L$ and $\delta_H$, $\epsilon_L \leq \epsilon_H \leq \epsilon$ which are the minimum and maximum errors, respectively, due to approximating all the network distances from A to B with λ. The value of $\epsilon_L$ and $\epsilon_H$ can be trivially obtained by modifying the procedure FIND-PATHCOHERENTPAIRS in PCP decomposition method of Table 1 (line 9) to compute and associate it with a PCP.

In addition, embodiments of the invention introduce a refinement operator which, when given a source u and destination v, can improve upon the quality of the approximation (known as the effective error) provided by λ by retrieving additional intermediate vertices in the shortest path from u to v. Note that an approximate error can be refined at most k times before the exact network distance is obtained, where k is the number of intermediate vertices in the shortest path between u and v. Also, it is assumed that the refinement operator will keep its own state information such as the set of intermediate vertices, effective error, etc., all of which may be abstracted from the user of this system. Further, it is assumed that a number of macros have been provided which given a source and destination vertex, will keep invoking the refinement operator as many times as needed to either achieve a predicted approximation quality, or until a certain condition is satisfied. A few example macros according to some embodiments of the invention are described below.

Approximate Network Distance Query: Given source vertex p and destination vertex q, find an intermediate vertex or edge, approximate network distance λ, and minimum $\epsilon_L$ and maximum $\epsilon_H$ errors due to the use of the approximation:
SELECT IE, VI, ES, EE 1, $\epsilon_L$, $\epsilon_H$ FROM O WHERE AB=$Z_4$(p, q)
η-approximate Network Distance Query: Given source p and destination q, find an approximate network distance with an approximation quality of η or better. The macro REFINE_UNTIL invokes the refinement operator until the desired approximation η is attained:

SELECT l, $\epsilon_L$, $\epsilon_H$ FROM O WHERE AB = $Z_4$(p, q) and
REFINE_UNTIL(EFFECTIVE ERROR OF(O.λ)≤ η)

Figures 5A, 5B:
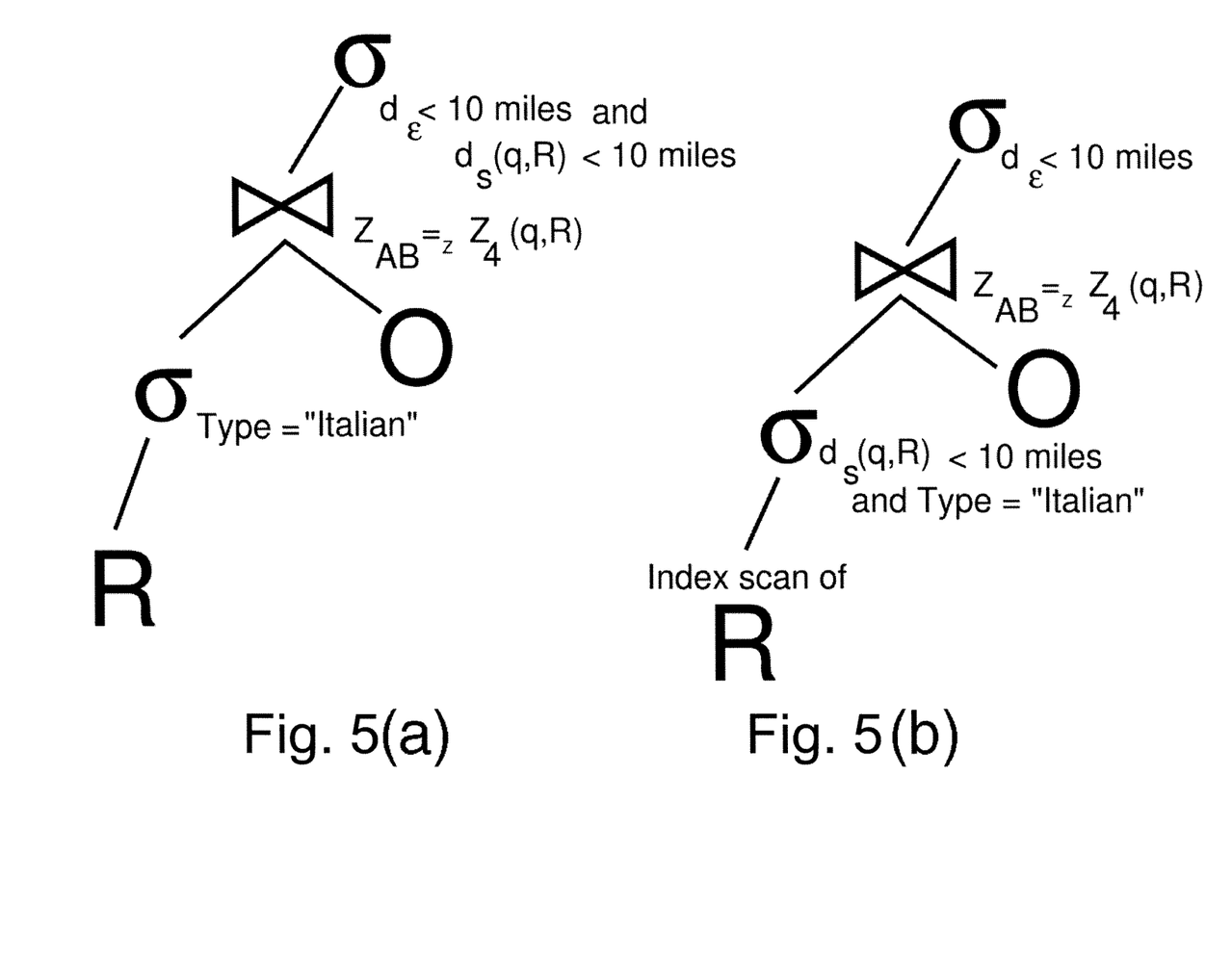
FIGS. 5a and 5b illustrate examples of a region search query, according to certain embodiments.

Region Search: Given a query location q, find all restaurants R(position, type) that are within 10 miles of q. The macro REFINE_UNTIL_DECIDE_IF invokes the refinement operator until it is clear if a restaurant is within 10 miles of q or is not:

SELECT R.position, λ FROM O, R WHERE AB = $Z_4$ (q, R.position)
and REFINE_UNTIL_DECIDE_IF(O.λ≤10 miles)

k-Nearest Neighbor Search: Given a query location q, find the k closest restaurants in R(position, type) to q that serve Italian cuisine. The results are produced by sorting on the λ values using a comparator (not given here) that is modified so that given two restaurants at distances $\lambda_1$ and $\lambda_2$, the comparator refines both $\lambda_1$ and $\lambda_2$ until it is clear if $\lambda_1 \leq \lambda_2$ or $\lambda_1 > \lambda_2$:

SELECT R.position, λ FROM O, R
WHERE AB = $Z_4$(q, R.position) and R.type = "Italian"
ORDER BY O. λ LIMIT k Distance Join Operator: Suppose that in addition to R, a relation of coffee shops Q(position, type) is also given. Now, find the k closest pairs of restaurants and coffee shops. This query uses the same sorting operator on λ as in the k-nearest neighbor search:

SELECT R.position, Q.position, λ FROM O, R, Q
WHERE AB = $Z_4$ (R.position, Q.position)
ORDER BY O.λ LIMIT k Embodiments of the invention can optimize queries on spatial networks that are expressed using SQL statements with a path-distance oracle. Any spatial query that is expressed using SQL can be converted into an operator tree, which is a computational tree made up of spatial and non-spatial relational operators. FIG. 5a, which is discussed in more detail below, is an example of an operator tree of an SQL query that performs region search on a spatial network. Note that the operator tree shown in FIG. 5a is just one of many possible strategies for answering a query. In other words, there are several ways of arriving at the correct answer and the job of generating all possible strategies and choosing among them is typically done by a query optimizer. Although there are many ways of answering a query, they typically have different associated costs. The database system can select the strategy with the least cost.

One scenario where optimization of queries involving path-distance oracles becomes difficult is if the user is only interested in a small subset of tuples, where the criterion for selecting relevant tuples is expressed either directly or indirectly in terms of network distances. For example, consider a query to find all the restaurants, given by the relation R, that are closer than 10 miles on a spatial network from an input address (i.e., point) q. One way of processing this query is to obtain the approximate network distances of every restaurant in R from q by joining the tuples of R with O, and then subsequently pruning away all restaurants that are farther than 10 miles on the spatial network from q. This solution strategy is not very efficient, especially if R is a large relation such as the one containing all the restaurants in the US. Another variation of this query is if the user is only interested in the "top k" closest restaurants to q in R, in which case, obtaining the network distances of all the restaurants in R from q and subsequently retaining the k closest to q results in wasted work. Both these inefficiencies occur because no restaurant in R can be excluded without first determining its network distance from q, which is not known until R is joined with O. The network distance may not be a computable quantity but, instead, may have to be retrieved from O. This means that a join of R with O may be inevitable at runtime as the identity of the query point q (or a relation S in case of distance joins) is only known at the time of execution of the query.

One embodiment implements a strategy for making query processing using a distance oracle efficient by making the query optimizer aware that the spatial distance between two objects on a spatial network always lower bounds the network distance between them. If the query processor uses this strategy effectively, then it can prune away most of the tuples in R using this relationship between the spatial and network distance functions. For example, in the case of the network range query, the query optimizer can first restrict the output to only contain those tuples in R whose spatial distance from q is less than 10 miles, which are then joined with distance oracle relation O, after which it again prunes those restaurants in R that are farther than 10 miles. Further, in some embodiments, a query optimizer can modify the operator tree suitably so that queries involving the path-distance oracle can be processed correctly and efficiently.

The following is a description of a few of the spatial relational operators that may be needed for query processing and which are commonly available on commercial database systems.

Index Scan: A spatial index, such as a quadtree, is an ordering of the tuples in a relation based on the space that they occupy. A spatial index allows for the browsing or retrieval of the tuples in a relation in many different ways, which we refer to as an index scan. For example, an index scan of R can retrieve tuples based on the distance from a query point q either in an increasing or decreasing order of distances from q. It can even obtain tuples based on containment or non-containment within a geometric shape, or some combination of distance and geometric constraints. An index scan can also be made incremental, which means that we need not specify how many tuples are needed before the start of the query but can keep obtaining more tuples until all the tuples in R have been exhausted. One method for incrementally retrieving tuples in R based on distances from q is the best first nearest neighbor method.

Spatial Select: A spatial select operator, represented by γ, is analogous to its non-spatial variant in the sense that it allows for the pruning of tuples in a relation based on a set of spatial constraints. An example of a spatial selection operation is, given a relation of restaurants in the US, obtain only those restaurants that are in New York city, which is represented by a polygon.

Spatial Join: Given two relations R and S, the distance join R ▶◀ S of R and S generates pairs of tuples (p, q) such that p is drawn from R and q from S, usually subject to an additional constraint involving the values of the spatial attributes of R and S. If the output pairs are ordered either in an increasing or decreasing order of distances between p and q, such a join is referred to as a distance join. The processing of spatial network distance join queries, according to one embodiment, may use the incremental distance join algorithm.

In order to process SQL queries with LIMIT constraints, embodiments of the invention use two SQL operators—STOP and RESTART. STOP operator suspends the output of an operator subtree once a predetermined condition is satisfied. The condition can either be specified in terms of a limit on the numbers of tuples produced by an operator subtree, or some other constraint determined at runtime. RESTART operator restarts a previously suspended operator subtree so that more tuples can be produced. A subtree of an operator tree is said to be restartable only if it can produce more tuples without having to re-compute all the previously computed tuples. Below it will be shown how a query optimizer can optimize queries on spatial networks using a path-distance oracle with the aid of the example macros discussed above.

Approximate Network Distance: Given a source p and a destination q on a spatial network, obtaining an ε-approximate network distance between p and q involves a selection on O with $Z_A(p, q)$ as the search key. Such a query involves a simple selection operator on the oracle relation O with the aid of the B-tree on $Z_{AB}$.

Region Search: FIG. 5a illustrates the operator tree corresponding to a query that finds all the Italian restaurants within 10 miles of a query point q. One way of processing such a query is to first determine the ε-approximate network distance of all the Italian restaurants in R, and then prune away all the restaurants in the output that are farther than 10 miles using a select operator. This is an inefficient approach as the query processing will visit every tuple in R, even the ones that are much further than 10 miles from q which will result in wasted work.

FIG. 5b illustrates a more efficient way of performing the region search query, according to one embodiment of the invention. FIG. 5b uses the property that the spatial distance between any two points on a spatial network always lower bounds the network distance between them. An embodiment of the invention first performs an index scan on R which is an incremental retrieval of the restaurants in R based on the spatial distance from q. The index scan stops when it obtains a restaurant in R whose spatial distance from q is farther than 10 miles. Among this subset of restaurants, only those that serve Italian food are chosen, and are subsequently joined with the distance oracle relation O to yield their network distances from q. Only those restaurants that are within 10 miles of q in terms of network distance are selected. The correctness of this approach can be easily seen by observing that any restaurant in R that was pruned away because its spatial distance from q was greater than 10 miles cannot be at a distance of less than 10 miles from q using a network distance function as the spatial network distance lower bounds the network distance between them.

Figure 6A:
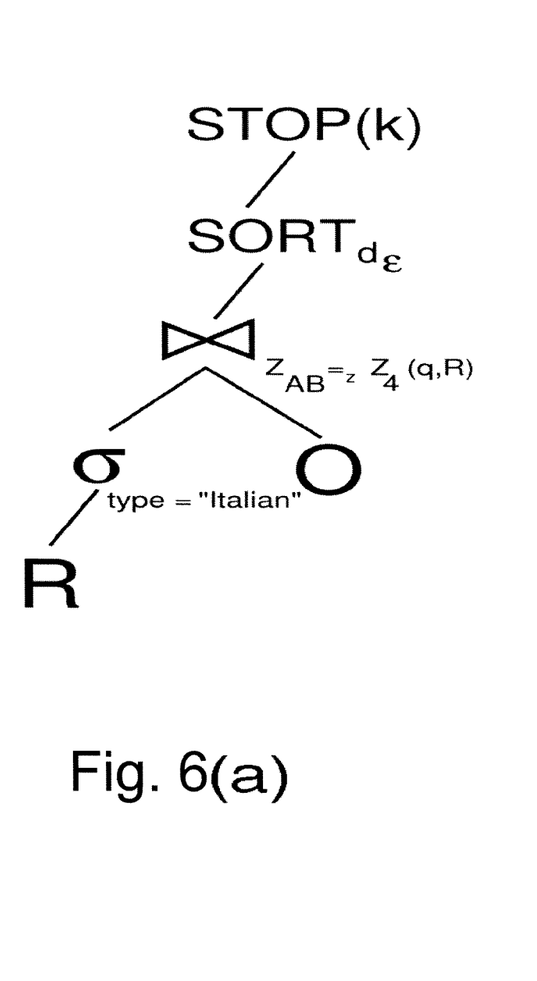
FIGS. 6a and 6b illustrate examples of a nearest neighbor search query, according to certain embodiments.
Figure 6B:
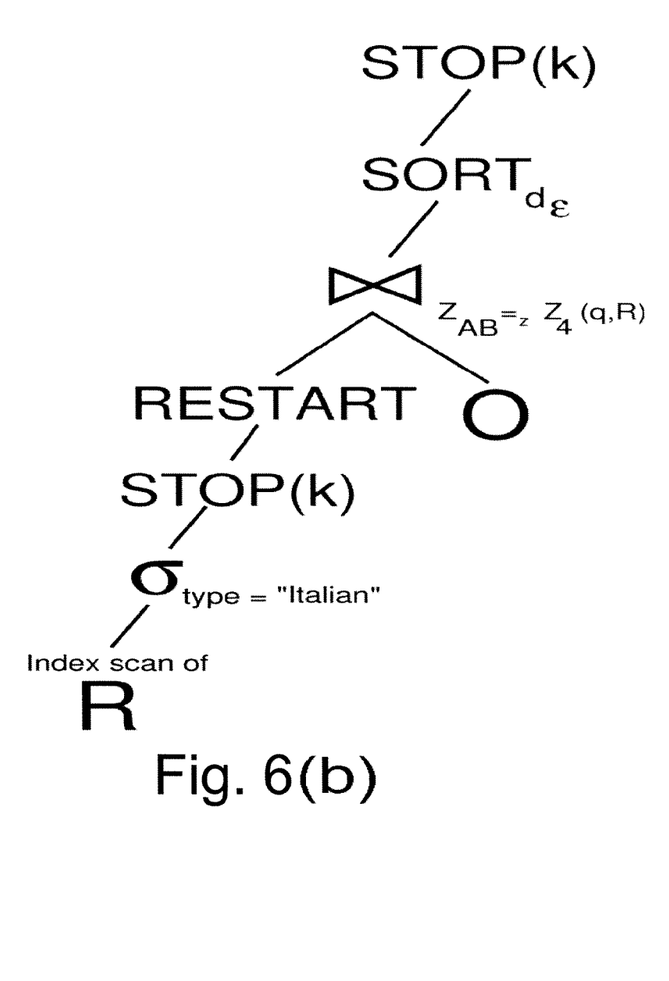

Note that it is conceivable that a restaurant r in R that is at both spatial and network distances that are a bit more than 10 miles from q, while having an ε-approximate network distance from q that is less than 10 miles owing to the approximation. In this case, some embodiments may miss reporting r even though its approximate network distance is less than 10 miles because r would not be in the initial set of restaurants whose spatial distance from q is less than 10 miles. An embodiment of the invention can overcome this problem by increasing the above spatial distance restriction to (1+ε)·10 miles, which would mean that r will now be reported in the result. In another embodiment, an additional constraint is added to the select operator in the un-optimized algorithm in FIG. 5a to prune away all those restaurants that are farther than 10 miles in the spatial distance measure.

k-Nearest Neighbor Search: FIG. 6a shows an un-optimized version of a k-nearest neighbor search on a spatial network which suffers from the same drawback as the region search in FIG. 5a in the sense that the algorithm ends up retrieving the network distances of all Italian restaurants in R, even though only a small subset of the Italian restaurants (i.e., k of them) are required in the result set. FIG. 6b illustrates an example of the optimized nearest neighbor search query. In particular, according to an embodiment, first select all tuples in R that are Italian restaurants which are then joined with the path-distance oracle relation O to yield the network distances of R from q. Only the top k tuples are retained from this set via the use of the STOP operator which corresponds to the k closest restaurants in R to q on the spatial network. Embodiments of the invention optimize the k-nearest neighbor query on spatial networks by obtaining the tuples in R in an increasing order of network distance from q. First, obtain the closest k Italian restaurants to R to q in terms of the spatial distance function, at which time the query subtree is suspended by the STOP operator. Now, these k tuples are joined with the distance oracle relation O to obtain their approximate network distances from q, which are then sorted to yield an upper bound on the network distance of the k farthest restaurant in R, which is referred to as $d_k$. Then, the earlier suspended query subtree is restarted (via RESTART) to yield more tuples incrementally in an increasing order of spatial distance from q, until a restaurant in R is obtained whose spatial distance to q is greater than $d_k$. These additional tuples are also joined with O to yield their network distances, at which point the closest k restaurants to q are chosen from a pool of restaurants from the initial set of k restaurants from before application of the STOP operator and the additional restaurants produced after application of the RESTART operator.

Figure 7A:
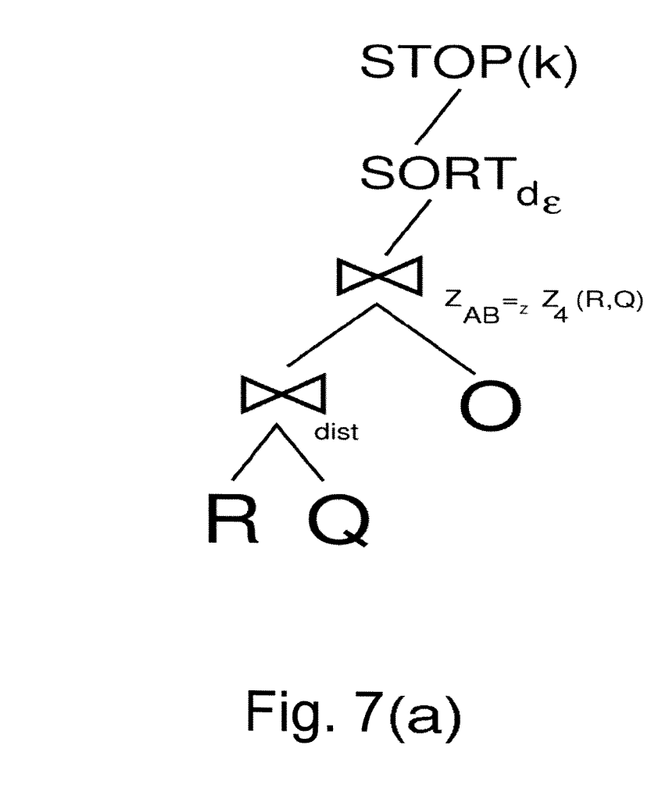
FIGS. 7a and 7b illustrate examples of a distance join query, according to certain embodiments.
Figure 7B:
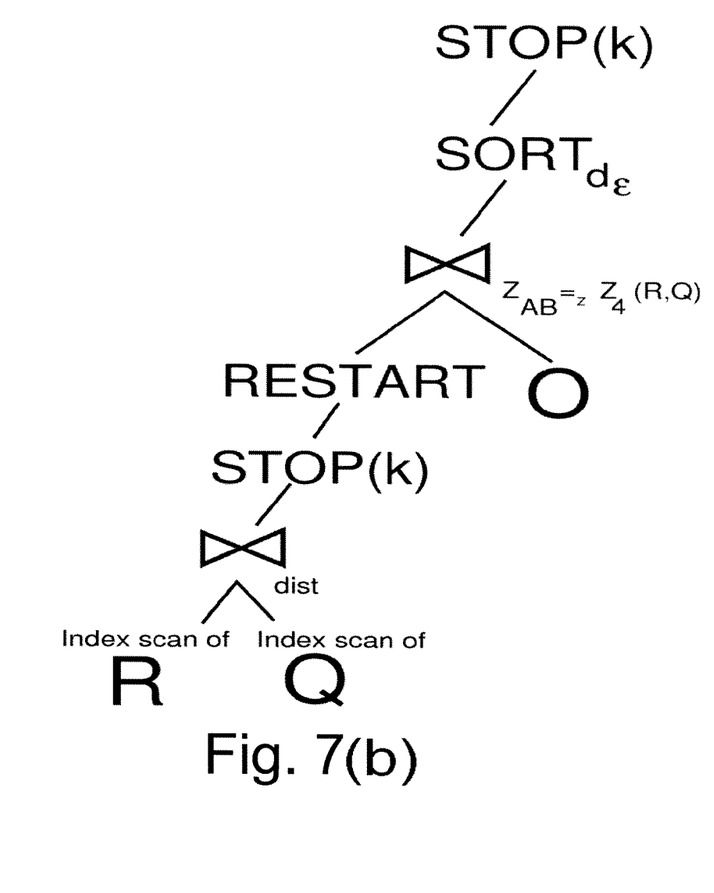

Distance Join: The distance join works in a similar manner to the k-nearest neighbor search in the sense that a query point q is replaced with a relation. As can be seen from FIG. 7a, the main difference between the operator trees for the nearest neighbor and the distance join queries is the use of a distance join operation between R and S using the spatial distance function. One embodiment uses an incremental distance join algorithm, which provides the ability to suspend and restart the operator as needed. One embodiment of a strategy for optimizing distance join queries on spatial networks is illustrated in FIG. 7b. It starts with application of the incremental distance join generating k pairs, whose network distances are ascertained by a join with O. An upper bound on the network distance is computed between the k farthest pair in the output, which is referred to as $d_k$. The distance join operation is restarted and more pairs are generated until a pair whose spatial distance is farther than $d_k$ is obtained, at which time, the operator is suspended once again. After obtaining the network distances of the additional pairs, the k closest pairs from the original k pairs as well as the newly generated pairs are chosen.

Figure 3:
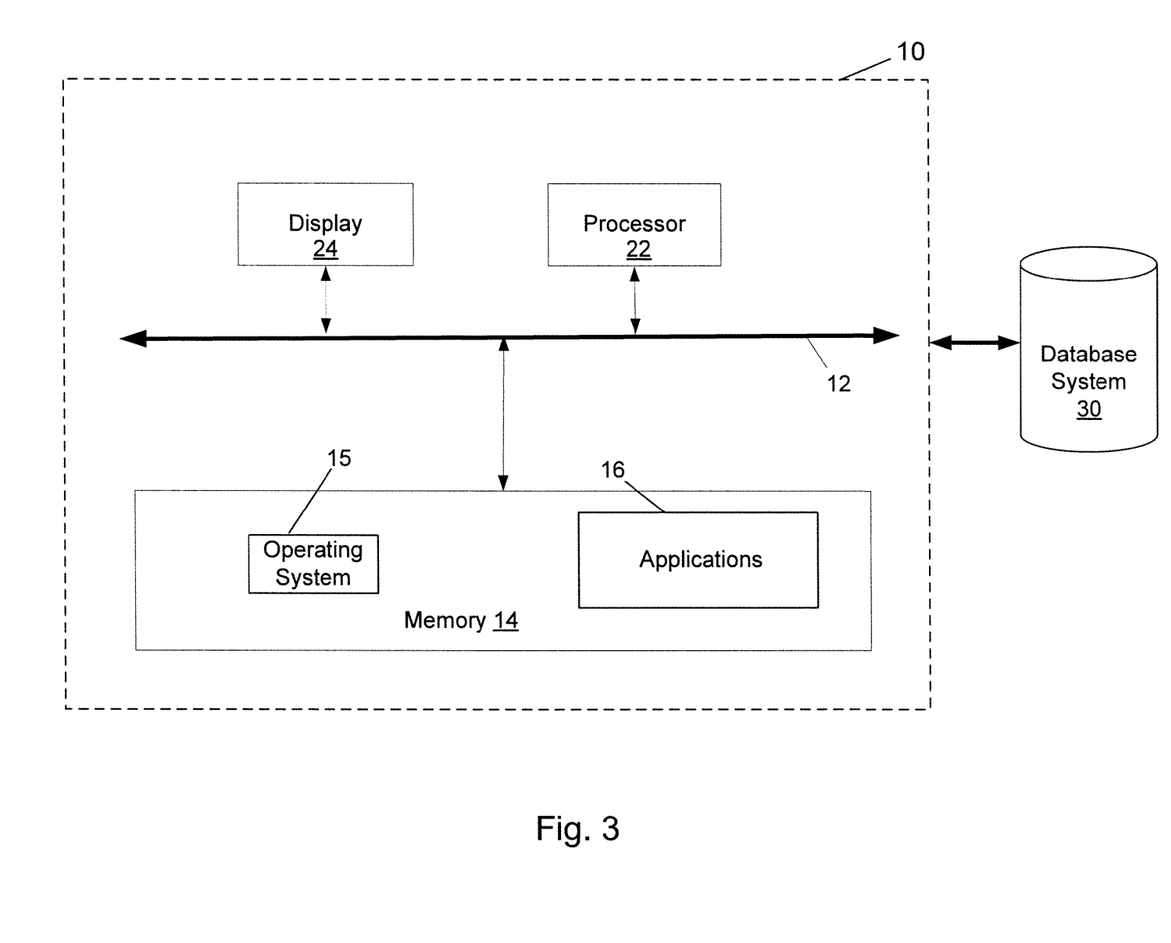
FIG. 3 illustrates an apparatus according to one embodiment.

FIG. 3 illustrates an example of an apparatus 10, according to an embodiment of the invention. Apparatus 10 may include an interface 12, such as a bus or other communications mechanism, for communicating information between components of apparatus 10. Alternatively, the components of apparatus 10 may communicate directly with each other, without use of interface 12.

Apparatus 10 also includes a processor 22, coupled to interface 12, for receiving, managing, and/or processing user input or information, and for executing instructions or operations. Processor 22 may be any type of general or specific purpose processor.

Apparatus 10 further includes memory 14 for storing information and instructions to be executed by processor 22. Memory 14 can be comprised of any combination of random access memory (RAM), read only memory (ROM), static storage such as a magnetic or optical disk, or any other type of machine or computer readable media. Computer readable media may be any available media that can be accessed by processor 22 and could include volatile or nonvolatile media, removable or non-removable media, and communication media. Communication media may include computer program code or instructions, data structures, program modules or other data, and includes any information delivery media. Processor 22 can further be coupled, via interface 12 or directly, to a graphical user interface or display 24 for displaying information to a user.

In one embodiment, memory 14 stores software modules or applications that provide functionality when executed by processor 22. The modules may include an operating system 15 that provides operating system functionality for apparatus 10. The memory 14 may also store applications 16, such as applications for interfacing with database system 30. Processor 22 and memory 14 may be coupled via interface 12, or directly, to database system 30 and, thus, may be able to access and retrieve information stored in database system 30. Although only a single database is illustrated in FIG. 3, any number of databases may be used in accordance with certain embodiments.

According to certain embodiments, processor 22 and memory 14 may be configured to control apparatus 10 to construct a path oracle, distance oracle, and/or a path-distance oracle, as discussed above. Further, in some embodiments, apparatus 10 may be controlled to perform the PCP decomposition method and the shortest path method discussed above, or any other method described herein. In one embodiment, apparatus 10 is configured to receive certain input including the spatial network G, the root block T of a PR-quadtree H on the spatial positions of V, the type of oracle (i.e., path, distance, and/or path-distance), and the quality of approximation $\epsilon$. Based on this input, apparatus 10 is controlled to construct the specified type of oracle by decomposing the spatial network into a set of PCPs that satisfy at least one of the three predefined properties discussed above. In particular, according to embodiments of the invention, the resulting decomposition may have the following properties:

1. $G \otimes G = U^l_{i=1}(A_i, B_i, \Psi_i, \lambda_i)$, where $(A_i, B_i, \Psi_i, \lambda_i)$ is a PCP $\forall i=1, \ldots, l$, such that $A = U^l_{i=1} A_i$ and $B = U^l_{i=1} B_i$.
2. $(A_i \cap B_i) = \emptyset$, $\forall i=1, \ldots, l$.
3. For any two PCPs $(A_i, B_i, \Psi_i, \lambda_i)$, $(A_j, B_j, \Psi_j, \lambda_j)$, $1 \leq i < j \leq l$ in $G \otimes G$, the resulting decomposition has the property that $(A_i \cap A_j)\_(B_i \cap B_j) = \emptyset$. In other words, for any pair of vertices (u, v), there exists a unique PCP $(A_i, B_i, \Psi_i, \lambda_i)$ in $G \otimes G$, such that $u \in A_i$, $v \in B_i$.

If the oracle type is path-distance, the decomposition of the spatial network into a set of PCPS, by apparatus 10, will result in the construction of a path-distance oracle that provides both an intermediate vertex of a shortest path between the two vertices in the spatial network and an approximate distance between the two vertices. Apparatus 10 may then be controlled to store the set of PCPs as a relation in database system 30.

Figure 4:
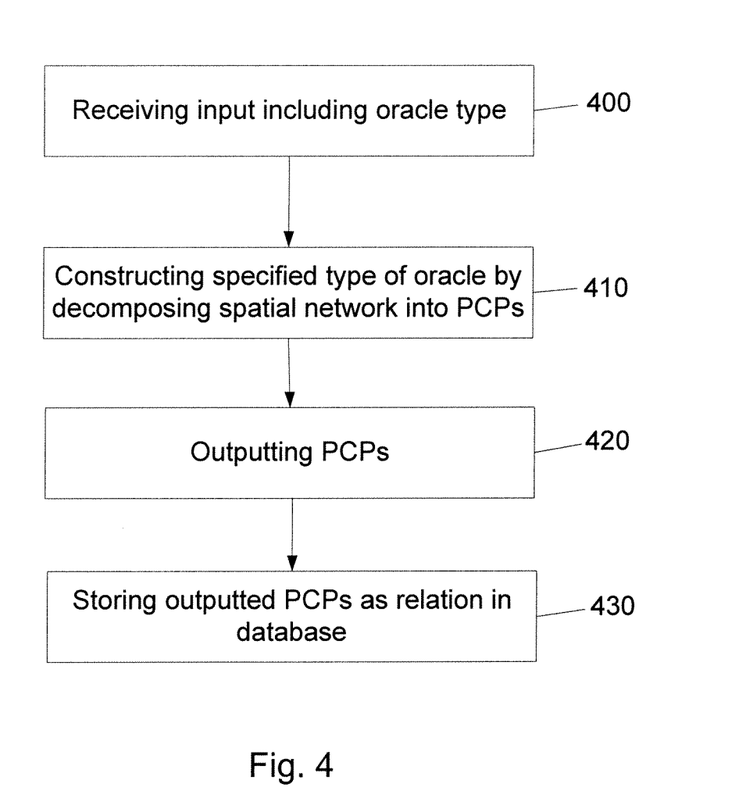
FIG. 4 illustrates a flow diagram of a method according to one embodiment.

FIG. 4 illustrates a flow diagram of a method for constructing a path, distance, and/or path-distance oracle, according to an embodiment of the invention. In some embodiments, the functionality of the method of FIG. 4, or any other method described herein, may be implemented by software and stored in memory or other computer readable or tangible media and executed by a processor. In other embodiments, the functionality may be performed by hardware, such as a graphics processing unit (GPU), or through the use of an application specific integrated circuit (ASIC), a programmable gate array (PGA), a field programmable gate array (FPGA), etc., or any other combination of hardware and software.

As illustrated in FIG. 4, the method includes, at 400, receiving input including the spatial network G, the root block T of a PR-quadtree H on the spatial positions of V, the type of oracle (i.e., path, distance, and/or path-distance), and the quality of approximation $\epsilon$. The method then includes, at 410, constructing the specified oracle type by decomposing the spatial network into PCPs that satisfy the properties discussed above. The decomposing of the spatial network may be performed by the PCP decomposition method described in Table 1 above. At 420, the method includes outputting the set of PCPs resulting from the decomposition of the spatial network. The set of PCPs can be a path oracle, distance oracle, or path-distance oracle depending on the oracle type specified in the input.

For example, when the specified oracle type is path-distance, the method of FIG. 4 would construct a path-distance oracle that provides both an intermediate vertex of the shortest path between two vertices in the spatial network. In one embodiment, the path-distance oracle would be constructed by decomposing the spatial network into a set of PCPs.

According to certain embodiments, any set of ordered PCPs may be considered an oracle. Referring again to FIG. 4, the method may also include, at 430, storing the set of PCPs as a relation in a relational database system. Once the set of PCPs (e.g., path-distance oracle) are stored, complex queries on the spatial network may be performed using the relational database system.

In view of the above, embodiments of the invention introduce two linear-sized constructs termed path and path-distance oracles that represent the $n^2$ shortest paths in a spatial network concisely. Certain embodiments exploit the observed coherence between the spatial positions of vertices and their interconnectivity. This enables the decomposition of a spatial network into groups of source and destination vertices, called path-coherent pairs, that share common vertices in their shortest paths. With the aid of a well-separated pair decomposition method, a path oracle can be constructed that takes $O(s^2 n)$ space ($s>2+2/\delta-1$ for $\delta>1$ and empirically is $12^2 n$), but which can retrieve an intermediate link in the shortest path between a source and a destination vertex in $O(\log n)$ time using a B-tree. Embodiments of the invention also introduce another representation called a path-distance oracle that takes $O(n \cdot \max(s^2, (1/\epsilon)^2))$ space (empirically $n \cdot \max(12^2, (2.5/\epsilon)^2))$ but which can yield an intermediate link in the shortest path as well as an $\epsilon$-approximation of the network distance in $O(\log n)$ time using a B-tree. The average access time for the oracles was on the order of tens of microseconds.

Further, embodiments of the invention reduce the access time of the path and path-distance oracles to $O(1)$ using a hash table of size $O(s^2 n \log n)$ for the path oracle and $O(n \log n \cdot \max(s^2, (1/\epsilon)^2))$ for the path-distance oracle. As a result of certain embodiments, shortest paths can be retrieved by making repeated SQL SELECT operations on the oracle relations which are stored in the database. Even more complex query processing scenarios on spatial networks can be performed by using the initial 8-approximation of the network distances, and performing subsequent refinement operations on the distances to improve the approximation.

One having ordinary skill in the art will readily understand that the invention as discussed above may be practiced with steps in a different order, and/or with hardware elements in configurations which are different than those that are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   constructing a path-distance oracle that provides both an intermediate vertex of a shortest path between two vertices in a spatial network and an approximate distance between the two vertices,
   wherein the constructing comprises decomposing the spatial network into a set of path-coherent pairs (PCPs) that satisfy at least one predefined property.

2. The method according to claim 1, wherein the decomposing comprises decomposing the spatial network into a set of path-coherent pairs (PCPs) that satisfy the at least one predefined property of: $G \otimes G = U^l_{i=1}(A_i, B_i, \Psi_i, \lambda_i)$, where $(A_i, B_i, \Psi_i, \lambda_i)$ is a PCP$\forall i=1, \ldots, l$, such that $A = U^l_{i=1} A_i$ and $B = U^l_{i=1} B_i$.

3. The method according to claim 1, wherein the decomposing comprises decomposing the spatial network into a set of path-coherent pairs (PCPs) that satisfy the at least one predefined property of: $(A_i \cap B_i) = \emptyset$, $\forall i = 1, \ldots, l$.

4. The method according to claim 1, wherein the decomposing comprises decomposing the spatial network into a set of path-coherent pairs (PCPs) that satisfy the at least one predefined property of: for any two path-coherent pairs (PCPs) $(A_i, B_i, \Psi_i, \lambda_i)$, $(A_j, B_j, \Psi_j, \lambda_j)$, $1 \le i < j \le l$ in $G \otimes G$, a resulting decomposition has the property that $(A_i \cap A_j)_{-}(B_i \cap B_j) = \emptyset$.

5. The method according to claim 1, further comprising storing the path-coherent pairs (PCPs) as a relation in a database system.

6. The method according to claim 1, wherein the set of path-coherent pairs (PCPs) are an oracle of order n, where n is a number of vertices in the spatial network.

7. The method according to claim 1, wherein the approximate distance between the two vertices comprises an $\epsilon$-approximate distance between the two vertices that lies within $\epsilon$ of a true distance between the two vertices.

8. The method according to claim 1, wherein a time to obtain the approximate distance between the two vertices is one of $O(\log n)$ and $O(1)$.

9. The method according to claim 1, wherein a size of the path-distance oracle is one of $O(n \cdot \max(s^2, 1/\epsilon^2))$ and $O(n \log n \cdot \max(s^2, (1/\epsilon)^2))$.

10. The method according to claim 1, wherein the shortest path is calculated by repeated SQL SELECT operations that find intermediate vertices between pairs of vertices, as well as an approximate network distance query, n-approximate network distance query, region search query, k-nearest neighbor search, and a distance join query.

11. An apparatus, comprising:
    a processor; and
    memory including computer program code,
    wherein the processor and memory are configured to control the apparatus to
       construct a path-distance oracle that provides both an intermediate vertex of a shortest path between two vertices in a spatial network and an approximate distance between the two vertices, wherein the processor and memory are further configured to control the apparatus to construct the path-distance oracle by controlling the apparatus to decompose the spatial network into a set of path-coherent pairs (PCPs) that satisfy at least one predefined property.

12. The apparatus according to claim 11, wherein the at least one predefined property comprises $G \otimes G = U^l_{i=1}(A_i, B_i, \Psi_i, \lambda_i)$, where $(A_i, B_i, \Psi_i, \lambda_i)$ is a PCP $\forall i=1, \ldots, l$, such that $A = U^l_{i=1} A_i$ and $B = U^l_{i=1} B_i$.

13. The apparatus according to claim 11, wherein the at least one predefined property of comprises $(A_i \cap B_i) = \emptyset$, $\forall i = 1, \ldots, l$.

14. The apparatus according to claim 11, wherein the at least one predefined property comprises, for any two path-coherent pairs (PCPs) $(A_i, B_i, \Psi_i, \lambda_i)$, $(A_j, B_j, \Psi_j, \lambda_j)$, $1 \leq i < j \leq l$ in $G \otimes G$, a resulting decomposition has the property that $(A_i \cap A_j)\_(B_i \cap B_j) = \emptyset$.

15. The apparatus according to claim 11, wherein the processor and memory are further configured to control the apparatus to store the path-coherent pairs (PCPs) as a relation in a database system.

16. The apparatus according to claim 11, wherein the set of path-coherent pairs (PCPs) are an oracle of order n, where n is a number of vertices in the spatial network.

17. The apparatus according to claim 11, wherein the approximate distance between the two vertices comprises an $\epsilon$-approximate distance between the two vertices that lies within $\epsilon$ of a true distance between the two vertices.

18. The apparatus according to claim 11, wherein a time to obtain the approximate distance between the two vertices is one of $O(\log n)$ and $O(1)$.

19. The apparatus according to claim 15, further comprising a query optimizer configured to optimize a query to the database system.

20. The apparatus according to claim 19, wherein the query comprises at least one of an approximate network distance query, a region search query, a nearest neighbor search query, and a distance join query.

21. A computer program, embodied on a non-transitory computer readable medium, the computer program configured to control a processor to perform a process, comprising:

constructing a path-distance oracle that provides both an intermediate vertex of a shortest path between two vertices in a spatial network and an approximate distance between the two vertices, wherein the constructing comprises decomposing the spatial network into a set of path-coherent pairs (PCPs) that satisfy at least one predefined property.

22. The computer program according to claim 21, wherein the decomposing comprises decomposing the spatial network into a set of path-coherent pairs (PCPs) that satisfy the at least one predefined property of: $G \otimes G = U^l_{i=1}(A_i, B_i, \Psi_i, \lambda_i)$, where $(A_i, B_i, \Psi_i, \lambda_i)$ is a PCP $\forall i=1, \ldots, l$, such that $A = U^l_{i=1} A_i$ and $B = U^l_{i=1} B_i$.

23. The computer program according to claim 21, wherein the decomposing comprises decomposing the spatial network into a set of path-coherent pairs (PCPs) that satisfy the at least one predefined property of: $(A_i \cap B_i) = \emptyset$, $\forall i = 1, \ldots, l$.

24. The computer program according to claim 21, wherein the decomposing comprises decomposing the spatial network into a set of path-coherent pairs (PCPs) that satisfy the at least one predefined property of: for any two path-coherent pairs (PCPs) $(A_i, B_i, \Psi_i, \lambda_i)$, $(A_j, B_j, \Psi_j, \lambda_j)$, $1 \leq i < j \leq l$ in $G \otimes G$, a resulting decomposition has the property that $(A_i \cap A_j)(B_i \cap B_j) = \emptyset$.

* * * * *